Dec. 24, 1968 V. UZUNOGLU ET AL 3,418,493

SEMICONDUCTOR MEMORY DEVICE

Filed Oct. 5, 1964

INVENTORS
Vasil Uzunoglu
& Phillip R. Koenig, Jr.

BY Gordon H Telfer

ATTORNEY

United States Patent Office 3,418,493

Patented Dec. 24, 1968

3,418,493

SEMICONDUCTOR MEMORY DEVICE

Vasil Uzunoglu, Hanover, and Phillip R. Koenig, Jr., Laurel, Md., assignors to Westinghouse Electric Corporation, Pittsburgh, Pa., a corporation of Pennsylvania Filed Oct. 5, 1964, Ser. No. 401,602
5 Claims. (Cl. 307—238)

ABSTRACT OF THE DISCLOSURE

A surface potential controlled transistor is operated as a memory element by application of a signal to be stored to an electrode over an oxide layer covering a PN junction termination. Stored charge modifies the gain of the transistor for a period after the signal is applied.

Figure 1:
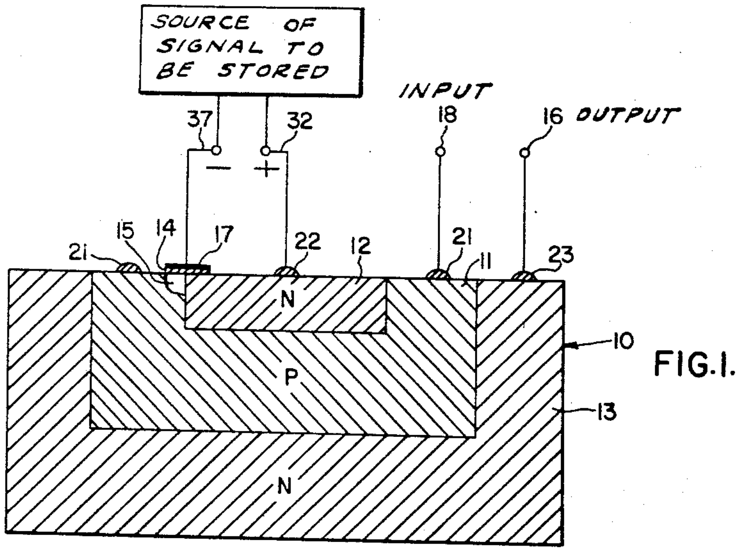

This invention relates to semiconductor memory devices and more particularly to a semiconductor tetrode operated in such a manner as to result in a structure with a long storage time that functions as a solid state memory device.

One basic form of semiconductor device is known as a surface-potential controlled transistor or semiconductor tetrode. This type of semiconductor junction device comprises a planar type of transistor with the usual geometry, but with an oxide layer on the surface of the emitter to base junction. An electrode is placed on this oxide layer with the electrode functioning as a grid. In operation of the semiconductor tetrode the voltage applied to the grid is used to modulate the emitter-base surface characteristics of the transistor and thereby the current gain characteristics of the transistor.

There are many computer installations today in which the computer is required to have a memory system with a storage time of up to a few hours. Memory systems for such computers have been built and are in existence but require many electronic components and result in a system of extremely large size and a system which is not very reliable. In accordance with the present invention the oxide layer between the emitter and base of a transistor is used to control the gain of the transistor and to provide a memory element with a long storage time. The oxide layer functions as a capacitor shunted by a resistor and thus has a very long storage time. A pulse applied to the storage portion of the transistor when it is operating in its linear region will change its gain, the gain depending on the pulse amplitude. This new state of the transistor will last as long as the charge stored on the oxide remains. Typical storage times are as high as 25 minutes.

Accordingly, the primary object of the present invention is to provide a semiconductor device capable of functioning as a solid state memory device with a long storage time.

A further object of the present invention is to provide a solid state memory device with gain so that information recovery is effective.

Another object of the present invention is to provide a solid state memory device in which any change in the output level is proportional to the signal applied to the device so that information on the amplitude of the applied signal is always available.

Yet another object of the present invention is to provide a solid state memory device which is no larger than an ordinary transistor and which in the event of a power failure still has the stored information available after the memory device has been reconnected to the power supply.

These and further features and objects of the present invention will appear from a reading of the following detailed description of a preferred embodiment of the invention, to be read in conjunction with the accompanying drawings wherein similar parts in the various views are identified by the same reference numeral.

Figure 2:
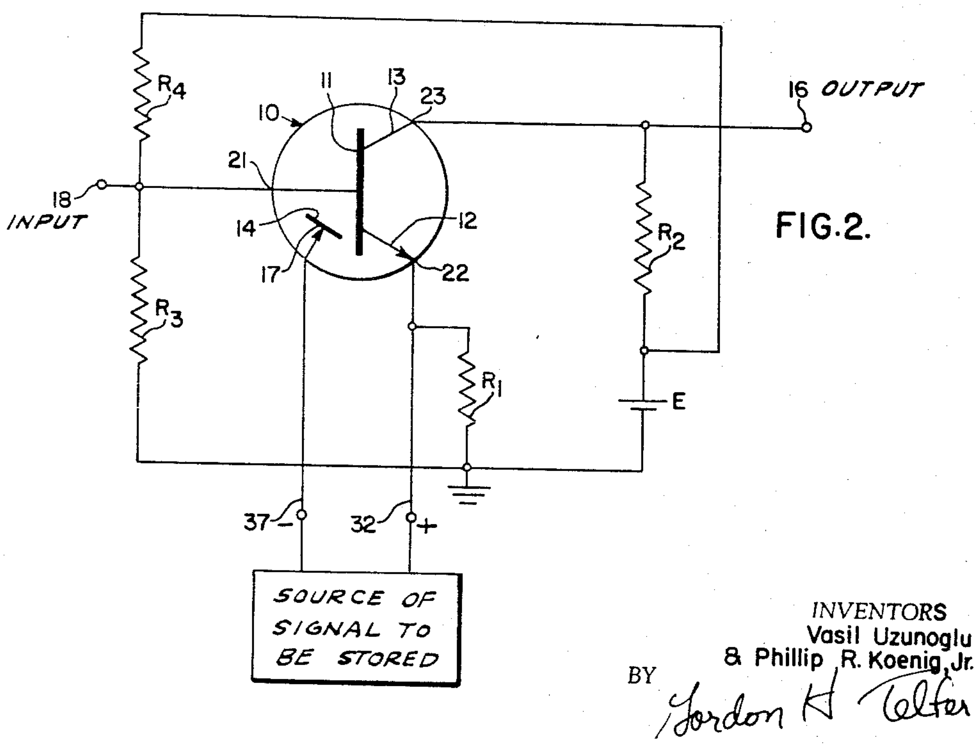

In the drawings:

FIGURE 1 is a sectionalized elevational view of a semiconductor memory device in accordance with the present invention, and FIG. 2 is an electrically equivalent circuit of the device illustrated in FIG. 1 with associated circuit elements.

Briefly stated the semiconductor memory device of the present invention comprises a planar type of transistor with an oxide layer on top of the emitter to base junction. The signal to be stored is applied between the emitter and the contact on the oxide layer. The transistor when operated in its normal mode has a given voltage gain. Upon the application of a signal, however, between the emitter and oxide layer with the plus polarity on the emitter side, in an NPN device, the gain of the transistor increases due to the elimination of surface defects and the increase of transport factor. Upon the removal of the signal the gain of the transistor remains unchanged due to the high time constant of the oxide region. The decay of the signal is determined by the thickness of the oxide coating and the properties of the oxide. Since the input impedance of the semiconductor memory device of the present invention is very high, it can be coupled to a circuit without in any way disturbing the circuit. In addition, an AC signal can be utilized as a permanent indication of the output level, which makes coupling of such a stage much easier. If the signal applied between the emitter and oxide layer is opposite from that described, gain is reduced for the period in which charge is stored on the oxide. A PNP transistor can also be used with an applied signal having the opposite effect on gain.

Referring now to the figures, the semiconductor memory device of the present invention comprises a transistor 10, here illustrated as being of NPN type. The transistor 10 has a base 11, an emitter 12 and a collector 13 with contacts 21, 22 and 23, respectively. A silicon dioxide layer 14 is deposited in any well-known manner on top of the emitter-base junction of the transistor 10 and a solid metal electrode 17 is attached to the oxide layer over the emitter-base junction. Preferably, the entire surface is covered by the oxide layer except where contact is made to the semiconductor material. The transistor 10 is readily fabricated in accordance with well known semiconductor device technology. The electrode 17 is used as a fourth terminal of the transistor 10 to control some properties of the transistor 10. The oxide layer or control terminal 14 has a high input resistance, the resistance being of the order of $10^{14}$ ohms, and a shunting capacitance in the order of 10 micro-micro-farads. The oxide layer 14 induces an inversion layer 15 on the structure of the transistor 10 between the emitter 12 and the base 11. The use of the oxide layer 14 provides a means to control the gain-bandwidth of the transistor 10. Leads 16, 18, 32 and 37 are attached to the collector contact 23, base contact 21, emitter contact 22 and oxide contact 17, respectively.

In an example of the operation of the transistor 10 illustrated in FIGURE 1, a signal is applied between the oxide layer 14 and the emitter 12 in the polarity shown in FIGURE 1, i.e. with the positive polarity on the emitter 12 and the negative polarity on the oxide layer 14. The application of a fixed bias between the oxide layer and the emitter in the polarity indicated results in two basic improvements in the operation of the transistor 10. The transport factor is thereby improved and the surface defects are reduced. Improvement of the transport factor leads to higher bandwidth and the reduction of surface defects improves the leakage as well as the current gain at low levels. It has been found that with a transistor built and operated in the manner described above, there is a 20% improvement in the gain-bandwidth of the transistor value when 6 volts is applied between the oxide layer or control grid and the emiter. Higher improvements can be achieved by optimizing the operating bias voltage.

The transistor 10 illustrated in FIGURE 1 operates as a memory device in the following manner. The transistor 10 without any control signal operates under its normal mode with a given voltage gain and current gain. If a pulse of the polarity indicated in FIGURE 1 is applied between the grid 14 and the emitter 12 the current gain of the device increases thereby increasing the output voltage at the terminal 16.

The oxide layer 14 is composed as indicated above of a capacitance shunted by a high resistance and therefore has a high time constant. Owing to this high time constant the charge created on the oxide layer 14 remains for a long time, thereby keeping the gain extremely high. It can therefore be seen that since the device of the present invention itself has gain, the information stored can easily be recovered. Thus, any variation can be amplified without necessitating any high quality low-level amplifier. In addition, the change in the output level of the device of the present invention is proportional to the level of the control signal so that information on the magnitude of the applied signal is always present.

Since the charge created on the oxide layer 14 remains for a long time due to high time constant, the information continues to be stored even if power fails. Once the power is re-applied the information can still be obtained.

It is also to be noted that the device of the present invention may be utilized as a polarity sensing element. Since reverse polarity across the grid 14 and emitter 12 reduces gain, the polarity of the signal applied to the device of the present invention can be determined from the variation of gain.

What has been described is a solid state memory device produced from a transistor having a control grid suitably placed over a silicon oxide layer which covers the surface of the emitter-base junction. The application of a voltage between the control grid and the emitter with positive polarity of the signal on the emitter side, will increase the collector current for a constant base current in an NPN transistor. The device of the present invention utilizes the high impedance level associated with the control grid to achieve a memory device with a long storage time.

FIG. 2 illustrates a typical circuit for operation as described above with the transistor 10 of FIG. 1. The supply E and resistors $R_1$, $R_2$, $R_3$ and $R_4$ are for providing desired operating potentials on the contacts of the device and their magnitude can be readily selected by those skilled in the semiconductor device art. The lead 18 to the base contact 21 may be used if desired to apply another input signal separate from that applied between the emitter and the oxide layer.

While the present invention has been shown and described in a few forms only, various modifications may be made within its spirit and scope.

We claim as our invention:

1. A solid state memory device for storing an information signal, said device comprising a transistor having a base, emitter and collector of semiconductive material wherein said base is of opposite conductivity type and is located between said emitter and collector with a PN junction between said base and each of said emitter and collector, said transistor being electrically connected to provide gain, an insulating layer on the emitter to base junction of said transistor, and means to apply a signal to be stored between the emitter of said transistor and said insulating layer.

2. A solid state memory device for storing an information signal, said device comprising a transistor having a base, emitter and collector of semiconductive material wherien said base is of opposite conductivity type and is located between said emitter and collector with a PN junction between said base and each of said emitter and collector, said transistor being electrically connected to provide gain, an oxide layer on said emitter to base junction of said transistor, an electrode interconnected with said oxide layer whereby said electrode functions as a grid, and means to apply a signal to be stored between the emitter of said transistor and said grid.

3. A solid state memory device for storing an information signal, said device comprising a transistor having a base, emitter and collector of semiconductive material wherein said base is of opposite conductivity type and is located between said emitter and collector with a PN junction between said base and each of said emitter and collector, said transistor being electrically connected to provide gain of an electrical signal parameter between an input at said base and an output at said collector, an oxide layer on the emitter to base junction of said transistor, said oxide layer having a high time constant, an electrode interconnected with said oxide layer whereby said electrode functions as a grid, and means to apply a signal to be stored between the emitter of said transistor and said grid with the positive side of said signal being applied to said emitter, said signal being applied for a first time and retained by said oxide layer for a time longer than said first time.

4. A solid state memory device for storing an information signal, said device comprising a transistor having a base, emitter and collector of semiconductive material wherein said base is of opposite conductivity type and is located between said emitter and collector with a PN junction between said base and each of said emitter and collector, said transistor being electrically connected to provide gain of an electrical signal parameter between an input at said base and an output at said collector, a silicon dioxide layer on the emitter to base junction of said transistor, said silicon dioxide layer having a high time constant, an electrode interconnected with said oxide layer whereby said electrode functions as a grid, and means to apply a signal to be stored between the emitter of said transistor and said grid.

5. A solid state memory device for storing an information signal, said device comprising an NPN transistor having a base, emitter and collector of semiconductive material wherein said base is of opposite conductivity type and is located between said emitter and collector with a PN junction between said base and each of said emitter and collector, said transistor being electrically connected to provide gain of an electrical signal parameter between an input at said base and an output at said collector, an oxide layer on the emitter to base junction of said transistor, an electrode interconnected with said oxide layer whereby said electrode functions as a grid, an information signal source, said information signal source having positive and negative terminals being connected between the emitter of said transistor and said grid with the positive terminal of said signal source being connected to said emitter, and said signal source having a high input impedance to prevent leakage of said stored signal.

References Cited

UNITED STATES PATENTS

| | | | |
|---|---|---|---|
| 3,017,613 | 1/1962 | Miller | 307—88.5 X |
| 3,112,411 | 11/1963 | Cook et al. | 307—88.5 |
| 3,204,160 | 8/1965 | Chih-Tang Sah | 317—235 |
| 3,243,669 | 3/1966 | Chin-Tang Sah | 317—235 |

JOHN S. HEYMAN, *Primary Examiner.*

U.S. Cl. X.R.

307—303; 317—235